United States Patent
Gluckler et al.

(10) Patent No.: US 8,485,939 B2
(45) Date of Patent: Jul. 16, 2013

(54) METHOD FOR CONTROLLING A DRIVE TRAIN

(75) Inventors: Johannes Gluckler, Friedrichshafen (DE); Alexander Maier, Friedrichshafen (DE); Bernard Hunold, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 150 days.

(21) Appl. No.: 13/274,580

(22) Filed: Oct. 17, 2011

(65) Prior Publication Data

US 2012/0115675 A1 May 10, 2012

(30) Foreign Application Priority Data

Nov. 9, 2010 (DE) .................. 10 2010 043 590

(51) Int. Cl.
- *B60W 10/02* (2006.01)
- *B60W 10/06* (2006.01)
- *B60W 10/08* (2006.01)
- *B60W 10/10* (2012.01)

(52) U.S. Cl.
USPC .............................................. 477/5

(58) Field of Classification Search
USPC .............................. 477/5, 109, 181
See application file for complete search history.

(56) References Cited

U.S. PATENT DOCUMENTS

| | | | |
|---|---|---|---|
| 7,691,029 B2 | 4/2010 | Guggolz et al. | |
| 2008/0064560 A1* | 3/2008 | Popp et al. | 477/5 |
| 2010/0042299 A1 | 2/2010 | Doebele et al. | |
| 2010/0105517 A1 | 4/2010 | Borntraeger | |
| 2010/0120582 A1 | 5/2010 | Reith et al. | |
| 2010/0125022 A1 | 5/2010 | Mittelberger et al. | |
| 2010/0248893 A1* | 9/2010 | Shimanaka | 477/5 |
| 2011/0009237 A1* | 1/2011 | Kim et al. | 477/5 |

FOREIGN PATENT DOCUMENTS

| | | |
|---|---|---|
| DE | 199 54 605 A1 | 7/2001 |
| DE | 101 22 158 A1 | 11/2002 |
| DE | 102 49 951 A1 | 5/2004 |
| DE | 10 2006 003 725 A1 | 8/2007 |
| DE | 10 2006 054 277 A1 | 5/2008 |
| DE | 10 2007 005 525 A1 | 8/2008 |
| DE | 10 2007 007 257 A1 | 8/2008 |
| DE | 10 2007 010 829 A1 | 9/2008 |
| DE | 10 2008 043 733 A1 | 5/2010 |
| EP | 0 676 566 A1 | 10/1995 |
| WO | 2008/107318 A1 | 9/2008 |

* cited by examiner

*Primary Examiner* — Edwin A Young
(74) *Attorney, Agent, or Firm* — Davis & Bujold, P.L.L.C.

(57) ABSTRACT

A method of controlling a drive-train of a motor vehicle, which comprises an internal combustion engine with a driveshaft, an electric machine in driving connection with the driveshaft of the internal combustion engine, a semi-automatic transmission with an input shaft and a plurality of gears that can be engaged selectively, and an automated friction clutch arranged between the driveshaft of the internal combustion engine and the input shaft of the transmission, such that a gearshift of the transmission occurs in combination with suitable control of the internal combustion engine while the friction clutch is at least partially and/or briefly engaged. To speed up the shifting process and to attenuate torque and speed surges during the shifting process, the electric machine is operated briefly as a generator and/or as a motor.

16 Claims, 4 Drawing Sheets

METHOD FOR CONTROLLING A DRIVE TRAIN

Figure 1A:
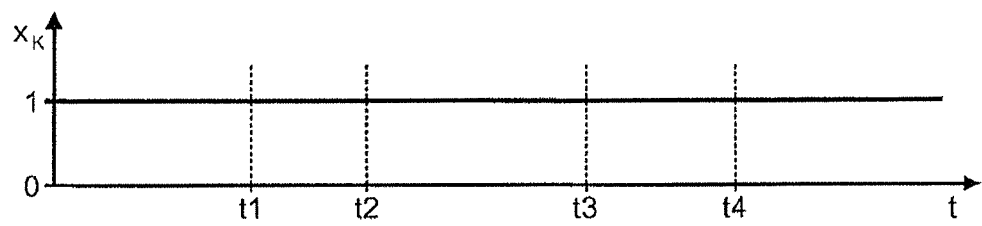

This application claims priority from German patent application serial no. 10 2010 043 590.2 filed Nov. 9, 2010.

FIELD OF THE INVENTION

The invention concerns a method for controlling a drivetrain of a motor vehicle.

BACKGROUND OF THE INVENTION

A gearshift in a semi-automatic change-speed transmission usually takes place in such manner that during a load reduction of the internal combustion engine the torque (motor torque) delivered by or taken up from the internal combustion engine is decreased and a friction clutch is opened, whereby the transmission becomes largely free from load. Then, the currently engaged gear carrying the load before the gearshift is disengaged, and the target gear to be engaged is synchronized and then engaged. To synchronize the target gear the rotational speed of the transmission input shaft is reduced for an upshift and increased for a downshift, so that the two clutch halves of the gear clutch of the target gears are rotating at much the same speed.

In the case of synchronized gear clutches, shift-related braking and acceleration of the transmission input shaft takes place by virtue of associated friction rings which are pressed together by the displacement force of the gear control element concerned. With unsynchronized gear clutches, shift-related braking and acceleration of the transmission input shaft can be effected by auxiliary devices, for example by means of a transmission brake in driving connection with the transmission input shaft, or an electric machine in driving connection with the transmission input shaft, or by the internal combustion engine if the friction clutch is at least partially closed. Once the target gear has been engaged the friction clutch is completely closed again and the motor torque of the internal combustion engine is increased again.

Although a gearshift controlled in such a manner takes place relatively comfortably and with low wear, it takes a comparatively long time and entails a relatively long interruption of the traction or thrust force. Accordingly, several methods for controlling shifts in semi-automatic transmissions have been proposed, in which a gearshift takes place in combination with suitable control of the internal combustion engine while the friction clutch is at least partially and/or temporarily closed.

For example, DE 199 54 605 A1 describes a method for controlling a semi-automatic transmission, in which a gearshift during emergency operation takes place with the friction clutch closed. In this case it is provided that the torque delivered by or taken from the internal combustion engine is reduced down to approximately zero and the currently engaged gear is then disengaged while largely free from load. Thereafter the transmission input shaft is decelerated or accelerated to the synchronous speed of the target gear by means of the internal combustion engine, and the target gear is then engaged.

From DE 101 22 158 A1 a method for controlling a semi-automatic transmission is known, in which a traction upshift takes place up to the slipping limit of an open friction clutch. After the partial opening of the friction clutch, the motor torque is first reduced, then the current gear is disengaged, and thereafter the target gear is engaged without synchronization. After the target gear has been engaged the speed of the drive motor is made equal to the rotational speed of the transmission input shaft by the motor control system and/or by closing the friction clutch, before the motor torque is increased again. In a transmission suitable for this shifting method, except for those of the starting gears the gear clutches can be in the form of unsynchronized claw clutches.

EP 0 676 566 B1 describes a method for controlling an internal combustion engine during an upshift of a semi-automatic transmission with the friction clutch closed. According to this, at the beginning of the upshift the internal combustion engine is decoupled by control means from the accelerator pedal and by manipulation of the fixed injection quantity a motor speed fluctuation is induced, which enables the current gear to be disengaged while largely free from load. Once the current gear has been disengaged the speed of the internal combustion engine is brought to the synchronous speed of the target gear by reducing the fuel injection quantity, i.e. the transmission input shaft is synchronized, so that the target gear can be engaged. Once the target gear has been engaged the motor control system is again coupled to the accelerator pedal, i.e. to produce a corresponding motor torque the injection quantity of the internal combustion engine is increased. The transmission for implementing this method is for example a group transmission with a multi-stage, unsynchronized main transmission and a two-stage, synchronized range group connected downstream from it.

In a method according to DE 102 49 951 A1 for controlling a drive-train that comprises an internal combustion engine, an automated friction clutch and a semi-automatic transmission it is provided that before any gearshift, as a function of measured operating parameters and with reference to set testing rules it is checked whether the shifting process intended can be carried out with a closed friction clutch. If it can, the gearshift is carried out without opening the friction clutch. Otherwise, the gearshift takes place in combination with opening the friction clutch. The transmission for using this control process is for example in the form of a group transmission comprising a multi-stage main transmission and a two-stage splitter group connected upstream from it.

DE 10 2006 054 277 A1 describes a method for carrying out a gearshift in a preferably unsynchronized semi-automatic transmission, in which the current gear is disengaged with the friction clutch closed, and the decision whether the target gear should also be engaged with the friction clutch closed or open during the gearshift sequence is made as a function of operating parameters. If the disengagement of the current gear is not completed within a specified time interval, the shifting mode is changed to one with the friction clutch open. To accelerate the opening of the friction clutch that may be necessary, the clutch is opened to approximately its slipping limit already before the decision about the shifting mode.

Finally, from DE 10 2007 010 829 A1 a method is known for controlling a semi-automatic group transmission with a multi-stage main transmission, a two-stage splitter group connected upstream, and a two-stage range group connected downstream from it. In a range shift in which a change of the gear ratio takes place at least in the main transmission and in the range group, the target gear ratio in the range group is synchronized by partially closing the friction clutch after the friction clutch has previously been opened, the range group shifted to neutral, the main transmission shifted, and in parallel with this the internal combustion engine has been brought to the synchronous speed of the target gear.

Such control methods have the disadvantage that the load reduction of an internal combustion engine at the beginning of a shifting process, the load increase of an internal combustion engine at the end of a shifting process, and the changing of the speed of an internal combustion engine to the synchronous speed of the target gear, take place relatively slowly because of the high moment of inertia of the internal combustion engine and its indirect control by means of the ignition and/or the fuel injection, so the time taken for the shifting process concerned is made longer. Furthermore, due to the control sequences of the internal combustion engine and the friction clutch during a shifting process torque peaks and speed surges can occur, which adversely affect the shifting or driving comfort of the motor vehicle concerned.

SUMMARY OF THE INVENTION

Accordingly, the purpose of the present invention is to speed up and increase the comfort of a gearshift in a semi-automatic transmission that is arranged in a drive-train of a motor vehicle of the type described at the start, having an internal combustion engine, an electric machine and an automated friction clutch.

The invention is based on the recognition that an electric machine in driving connection with the driveshaft of the internal combustion engine can be used during a shifting process for a short time in generator operation and/or motor operation to assist and speed up the load reduction of the internal combustion engine at the beginning of a shifting process, the load increase at the end of a shifting process, and with the friction clutch at least partially closed, to synchronize the target gear during an shifting process.

As is known, in an electric machine the functions of a conventional electric motor and that of a conventional generator are combined in a single aggregate. An electric machine can be in drive connection, via a transmission such as a spur gear system or a wrap-around transmission, with the driveshaft of the internal combustion engine, or it can be connected directly thereto. Thus, the use of an electric machine saves weight and fitting space and reduces the complexity of the internal combustion engine. In addition, an electric machine can be used for actively damping typical rotational fluctuations of a piston internal combustion engine.

Consequently, according to the invention the set objective is achieved by operating an electric machine temporarily as a generator and/or a motor in order to speed up the shifting process and to attenuate torque and speed surges during the shifting process.

In this way, by using the electric machine whose control dynamics are much more rapid than those of the internal combustion engine, compared with the known shifting sequences, the shifting process concerned can be sped up and made more comfortable without the need any additional apparatus complexity.

Consequently, during a traction upshift or a traction downshift it is provided that the load reduction of the internal combustion engine at the beginning of the shifting process is assisted and sped up by operating the electric machine for a short time as a generator. The drive torque produced by the internal combustion engine is in this case at least partly offset by the torque taken up for operating the electric machine as a generator.

Analogously, during a thrust upshift or a thrust downshift it is provided that the load reduction of the internal combustion engine at the beginning of the shifting process is assisted and sped up by operating the electric machine as a motor for a short time. The torque taken up by the internal combustion engine in dragging operation is in this case at least partly offset by the torque delivered by operating the electric machine as a motor.

In the case of an upshift, it is provided that the synchronization of the target gear is assisted and sped up with the friction clutch at least partially closed, by operating the electric machine as a generator for a short time, or just by generator operation of the electric machine. In this case required slowing of the transmission input shaft for synchronization of the target gear takes place at least in part by virtue of the torque taken up when the electric machine is operating as a generator.

Analogously, during a downshift it is provided that synchronization of the target gear is assisted and sped up with the friction clutch at least partially closed, by operating the electric machine as a motor for a short time. In this case speeding up of the transmission input shaft required for synchronizing the target gear takes place at least in part by virtue of the torque produced when the electric machine is operating as a motor.

During a traction upshift or a traction downshift it is provided that the load increase of the internal combustion engine at the end of the shifting process is assisted and sped up by operating the electric machine as a motor for a short time. In this case the increasing drive torque delivered by the internal combustion engine is supplemented by the torque supplied by the electric machine operating as a motor.

Analogously, during a thrust upshift or a thrust downshift it is provided that the load increase of the internal combustion engine at the end of the shifting process is assisted and sped up by operating the electric machine as a generator for a short time. The increasing torque taken up by the internal combustion engine as drag torque is in this case reinforced by the torque taken up by operating the electric machine as a generator.

According to the invention a traction downshift carried out in a group transmission with a multi-stage main transmission and a two-stage splitter group connected upstream from it, as a splitter group downshift with the friction clutch engaged, takes place in the following steps:

a) load reduction of the internal combustion engine, accelerated by generator operation of the electric machine, b) disengagement of the current gear in the main transmission, c) shifting of the splitter group from the current input gear to the target input gear, d) synchronization of the target input gear, between leaving the current shift position and reaching the target shift position of the splitter group, by accelerating the internal combustion engine, this being sped up by operating the electric machine as a motor, e) re-engagement of the current gear in the main transmission f) increasing the internal combustion engine load, which is sped up by operating the electric machine as a motor.

According to the invention, a traction downshift carried out in a group transmission with a multi-stage main transmission and a two-stage splitter group connected upstream from it, as a main transmission downshift with the friction clutch engaged, takes place in the following steps:

a) load reduction of the internal combustion engine, accelerated by generator operation of the electric machine, c') shifting of the main transmission from the current input gear to the target input gear, d') synchronization of the target gear of the main transmission between leaving the current shift position and reaching the target shift position of the main transmission, by accelerating the internal combustion engine, this being sped up by operating the electric machine as a motor, f) increasing the internal combustion engine load, which is sped up by operating the electric machine as a motor.

According to the invention, a traction downshift carried out in a group transmission with a multi-stage main transmission and a two-stage splitter group connected upstream from it, as a combined splitter group upshift and main transmission downshift with the friction clutch engaged, takes place in the following steps:

a) load decrease of the internal combustion engine, accelerated by generator operation of the electric machine, b) disengagement of the current gear in the main transmission, c) shifting of the splitter group from the current input gear to the target input gear, d") synchronization of the target input gear in the splitter group between leaving the current shift position and reaching the target shift position in the splitter group by slowing down the internal combustion engine, this being accelerated by generator operation of the electric machine, or by generator operation of the electric machine alone, d') synchronization of the target gear in the main transmission by accelerating the internal combustion engine, this being sped up by operating the electric machine as a motor, e') engagement of the target gear in the main transmission, f) increasing the internal combustion engine load, which is sped up by operating the electric machine as a motor.

Analogously, according to the invention a traction upshift carried out in a group transmission with a multi-stage main transmission and a two-stage splitter group connected upstream from it, as a splitter group upshift with the friction clutch engaged, takes place in the following steps:

g) reduction of the internal combustion engine load, accelerated by generator operation of the electric machine, h) disengagement of the current gear in the main transmission, i) shifting of the splitter group from the current input gear to the target input gear, j) synchronization of the target input gear in the splitter group between leaving the current shift position and reaching the target shift position in the splitter group, by slowing down the internal combustion engine, this being accelerated by generator operation of the electric machine, or by generator operation of the electric machine alone, k) re-engagement of the current gear in the main transmission l) increasing the internal combustion engine load, which is sped up by operating the electric machine as a motor.

Likewise, according to the invention a traction upshift carried out in a group transmission with a multi-stage main transmission and a two-stage splitter group connected upstream from it, as a main transmission upshift with the friction clutch engaged, takes place in the following steps:

g) reduction of the internal combustion engine load, accelerated by generator operation of the electric machine, i') shifting of the main transmission from the current gear to the target gear, j') synchronization of the target gear in the main transmission between leaving the current shifting position and reaching the target shifting position in the main transmission by slowing down the internal combustion engine, this being accelerated by generator operation of the electric machine or by generator operation of the electric machine alone, l) increase of the internal combustion engine load, which is accelerated by operating the electric machine as a motor.

Furthermore, according to the invention a traction upshift carried out in a group transmission with a multi-stage main transmission and a two-stage splitter group connected upstream therefrom, as a combined splitter group downshift and main transmission upshift with the friction clutch engaged, takes place in the following steps:

g) reduction of the internal combustion engine load, accelerated by generator operation of the electric machine, h) disengagement of the current gear in the main transmission, i) shifting of the splitter group from the current input gear to the target input gear, j") synchronization of the target input gear in the splitter group between leaving the current shifting position and reaching the target shifting position in the splitter group, by accelerating the internal combustion engine, this being made faster by operating the electric machine as a motor, j') synchronization of the target gear in the main transmission by slowing down the internal combustion engine, this being accelerated by generator operation of the electric machine, or by generator operation of the electric machine alone, k') engagement of the target gear in the main transmission l) increasing the internal combustion engine load, which is accelerated by operating the electric machine as a motor.

In each case the internal combustion engine load can be reduced until zero torque is reached or until a positive residual torque is reached. In the latter case, which enables a subsequent more rapid acceleration and more rapid load increase of the internal combustion engine, the freedom of the transmission input shaft from load, required for disengaging the current gear and engaging the target gear, is produced by taking up a corresponding torque by operating the electric machine as a generator.

According to the invention, a traction downshift carried out in a group transmission with a multi-stage main transmission and a two-stage splitter group connected upstream therefrom, as a splitter group downshift with a briefly disengaged friction clutch, takes place in the following steps:

m) brief disengagement (snatch operation) of the friction clutch, n) load reduction and acceleration of the internal combustion engine to the target speed of the target input gear in the splitter group, o) shifting of the splitter group from the current input gear to the target input gear, p) synchronization of the target input gear in the splitter group between leaving the current shifting position and reaching the target shifting position in the splitter group by partially engaging the friction clutch and by operating the electric machine as a motor, q) complete engagement of the friction clutch and increase of the internal combustion engine load, which is accelerated by operating the electric machine as a motor.

BRIEF DESCRIPTION OF THE FORMAL DRAWINGS

Figure 1B:
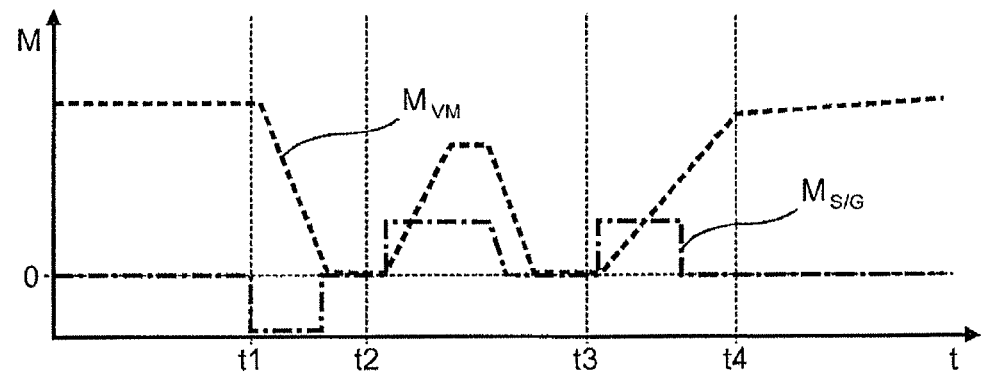
Figure 1C:
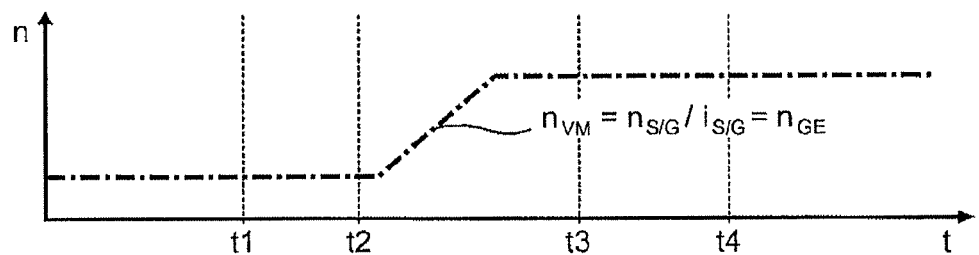
Figure 1D:
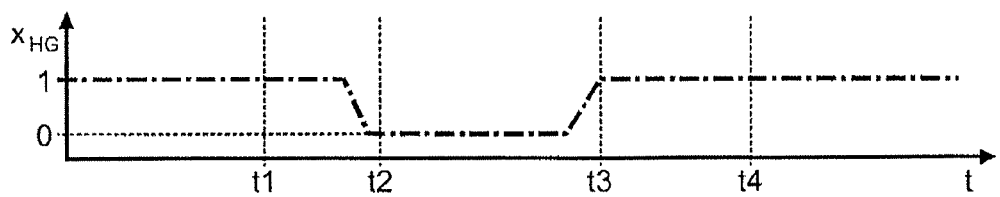
Figure 1E:
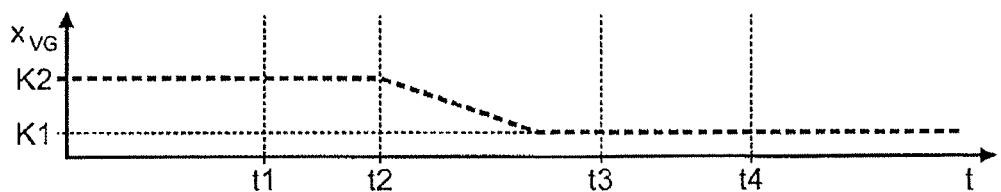
Figure 2A:
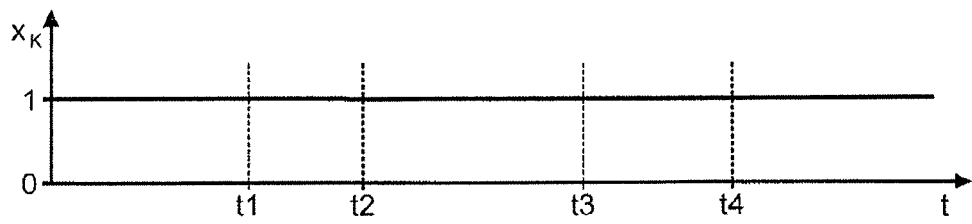
Figure 2B:
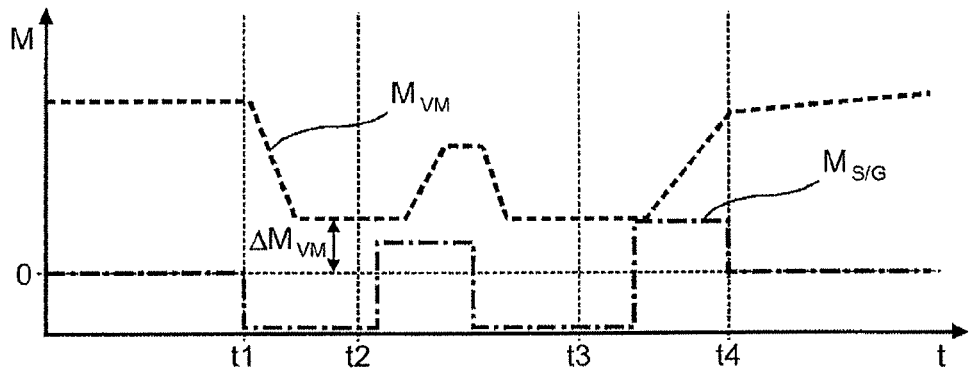
Figure 2C:
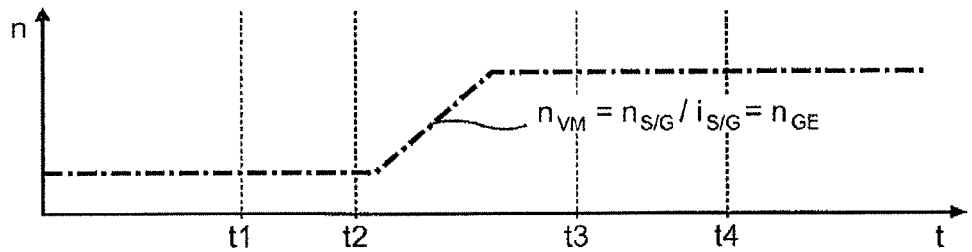
Figure 2D:
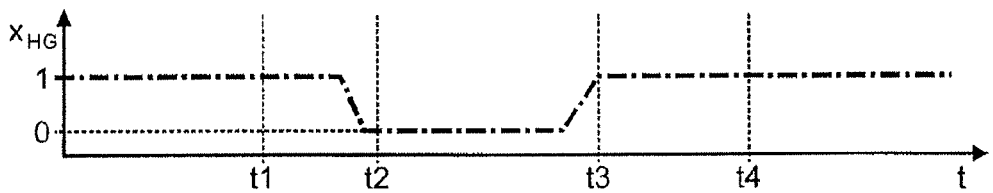
Figure 2E:
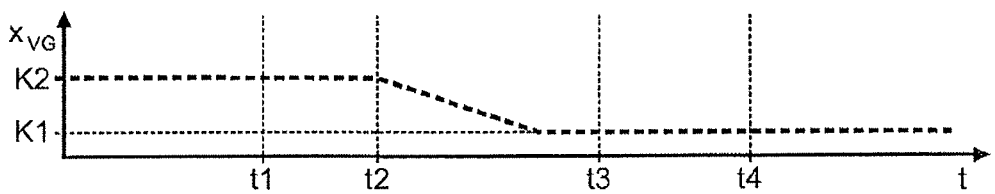
Figure 3A:
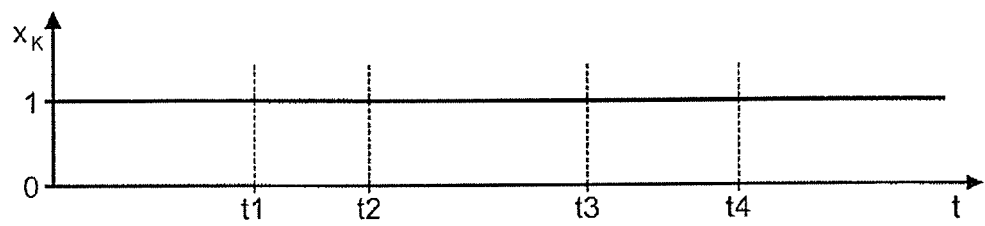
Figure 3B:
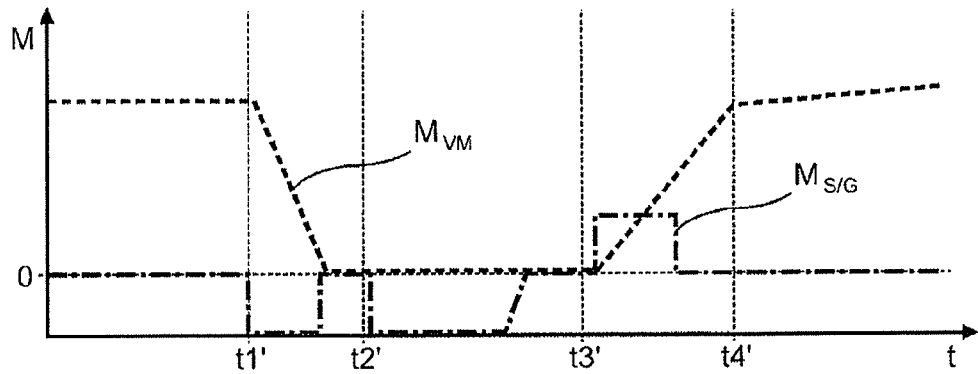
Figure 3C:
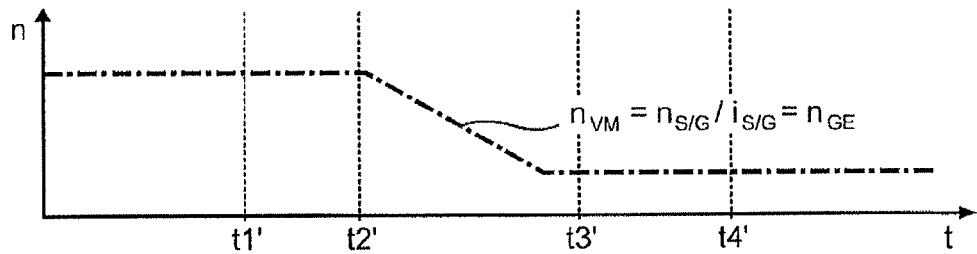
Figure 3D:
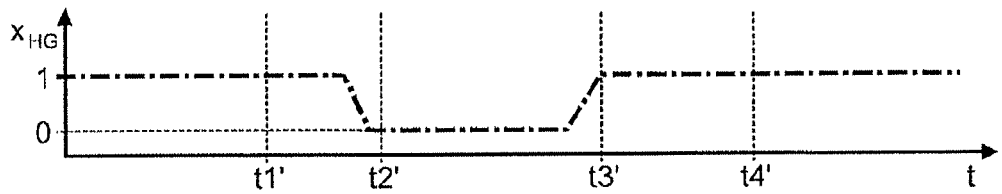
Figure 3E:
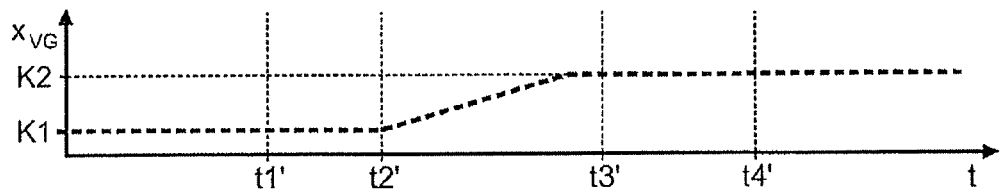
Figure 4A:
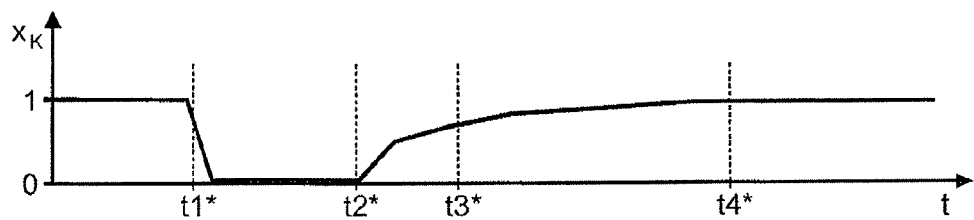
Figure 4B:
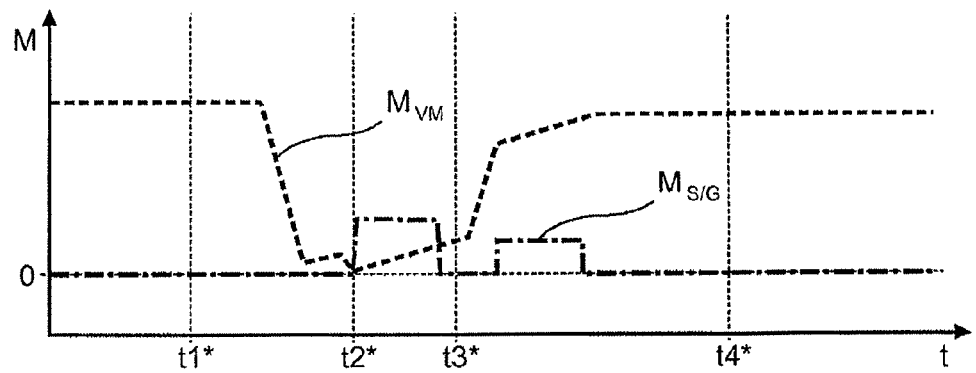
Figure 4C:
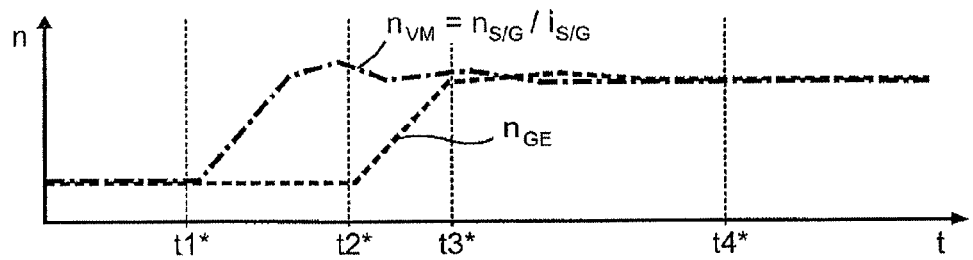
Figure 4D:
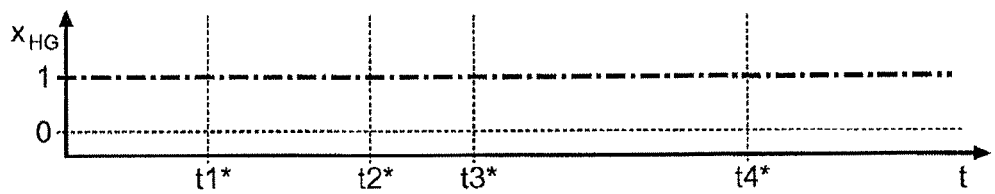
Figure 4E:
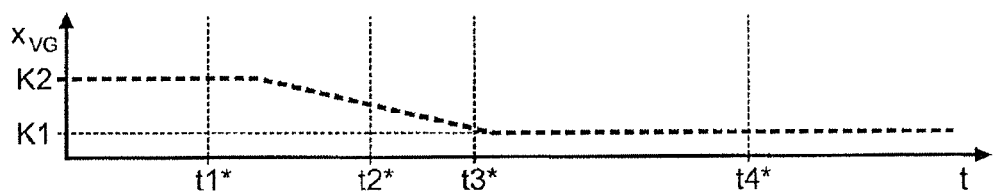

To clarify the invention a drawing with example embodiments is attached to the description. The drawing shows:

FIG. 1: Variations of the clutch condition, torque, speed and shift status during a control sequence according to the invention for a traction downshift in a group transmission with an engaged friction clutch, FIG. 2: Variations of the clutch condition, torque, speed and shift status during a control sequence according to the invention modified compared with that of FIG. 1, for a traction downshift in a group transmission with an engaged friction clutch, FIG. 3: Variations of the clutch condition, torque, speed and shift status during a control sequence according to the invention for a traction downshift in a group transmission with an engaged friction clutch, and FIG. 4: Variations of the clutch condition, torque, speed and shift status during a control sequence according to the invention for a traction downshift in a group transmission with a briefly disengaged friction clutch.

DETAILED DESCRIPTION OF THE PREFERRED EMBODIMENTS

Below, the above shifting processes of a group transmission comprising a multi-stage main transmission HG and a two-stage splitter group VG connected upstream therefrom, and whose input shaft GE can be connected by an automated friction clutch K to the driveshaft of an internal combustion engine VM which is in driving connection with an electric machine S/G, are explained with reference to the diagrams of FIG. 1 to FIG. 4. The structure of a group transmission of this type can be seen for example in DE 10 2007 010 829 A1 (see FIG. 1a and FIG. 1b therein).

The present diagrams of FIG. 1 to FIG. 4 each show in part a) the time variation of the degree of closure $x_K(t)$ of the friction clutch K, in part b) the torque variation $M_{VM}(t)$ of the internal combustion engine and the torque variation $M_{S/G}(t)$ of the electric machine, in part c) the speed variation $n_{VM}(t)$ of the internal combustion engine and if needs be also the speed variation $n_{GE}(t)$ of the transmission input shaft, in part d) the variation of the shifting status of the main transmission $x_{HG}(t)$, and in part e) the variation of the shifting status of the splitter group $x_{VG}(t)$.

In the diagrams of FIG. 1 the time variations $x_K(t)$, $M_{VM}(t)$, $M_{S/G}(t)$, $n_{VM}(t)$, $x_{HG}(t)$ and $x_{VG}(t)$ are shown, for a sequence according to the invention during a traction downshift carried out as a splitter group downshift with the friction clutch K engaged ($x_K=1$). The gearshift begins at time t1 with the load reduction of the internal combustion engine VM, which is assisted and accelerated by briefly operating the electric machine S/G as a generator ($M_{S/G}<0$). This reduces the drive torque produced by the internal combustion engine VM ($M_{VM}>0$) virtually to zero ($M_{VM}=0$). Then the drive-train is opened by disengaging the current gear in the main transmission HG ($x_{HG}=0$). From time point t2 the shifting of the splitter group VG from the current input gear K2 to the target input gear K1 begins.

Once the current shift position ($x_{VG}=K2$) of the splitter group VG has been left, i.e. once the current gear K2 has been disengaged, the synchronization of the target input gear K1 in the splitter group VG begins by accelerating the internal combustion engine VM, which entails increasing the motor torque ($M_{VM}>0$) and this is assisted and sped up by briefly operating the electric machine S/G as a motor ($M_{S/G}>0$). When the synchronous speed has been reached, the target input gear K1 of the splitter group VG is engaged and the drive-train is closed again by re-engaging the current gear ($x_{VG}=1$) in the main transmission HG.

Thereafter, from time t3 the load increase of the internal combustion engine VM takes place, assisted and accelerated by briefly operating the electric machine S/G as a motor ($M_{S/G}>0$) during the interval t3 to t4. At time t4 the load increase of the internal combustion engine VM and thus the shifting process as a whole have been completed.

The time variations $x_K(t)$, $M_{VM}(t)$, $M_{S/G}(t)$, $n_{VM}(t)$, $x_{HG}(t)$ and $x_{VG}(t)$ shown in the diagrams of FIG. 2 also relate to a sequence according to the invention for a traction downshift carried out as a splitter group downshift with the friction clutch engaged ($x_K=1$). The difference from the process sequence of FIG. 1 is that in this case the load of the internal combustion engine VM is reduced not down to zero, but only to a positive residual torque ($M_{VM}=\Delta M_{VM}>0$). Consequently, the transmission input shaft GE is rendered load-free by a corresponding torque take-up ($M_{S/G}=-\Delta M_{VM}$) by the electric machine S/G in generator operation, which is only interrupted by operating the electric machine S/G briefly as a motor ($M_{S/G}>0$) in order to synchronize the target input gear K1 of the splitter group VG and is terminated by the brief motor operation ($M_{S/G}>0$) of the electric machine S/G to increase the load at the end of the shifting process (t3 to t4). The incomplete load reduction of the internal combustion engine during the shifting process results in higher dynamics during the subsequent acceleration and load increase.

The diagrams of FIG. 3 show the time variations $x_K(t)$, $M_{VM}(t)$, $M_{S/G}(t)$, $n_{VM}(t)$, $x_{HG}(t)$ and $x_{VG}(t)$ for a sequence according to the invention of a traction upshift carried out as a splitter group upshift with the friction clutch K engaged ($x_K=1$). The gearshift begins at time t1 with the load reduction of the internal combustion engine VM which is assisted and accelerated by briefly operating the electric machine S/G as a generator ($M_{S/G}<0$). Thereby, the drive torque ($M_{VM}>0$) delivered by the internal combustion engine VM is reduced virtually to zero ($M_{VM}=0$). From time t2' the shifting of the splitter group VG from the current input gear K1 to the target input gear K2 begins. After leaving the current shift position ($x_{VG}=K1$) of the splitter group VG, i.e. once the current gear K1 has been disengaged, the synchronization of the target input gear K2 in the splitter group VG begins, which in this case takes place alone by operating the electric machine SIG as a generator ($M_{S/G}<0$). When the synchronous speed has been reached the target input gear K2 of the splitter group VG is engaged and thereafter the drive-train is closed again by re-engaging the current gear in the main transmission HG ($x_{HG}=1$). Then, from time t3' the load of the internal combustion engine VM is increased, assisted and accelerated by briefly operating the electric machine S/G as a motor ($M_{S/G}>0$). At time t4" the load increase of the internal combustion engine VM and hence the shifting process as a whole are completed.

In the diagrams of FIG. 4 the time variations $x_K(t)$, $M_{VM}(t)$, $M_{S/G}(t)$, $n_{VM}(t)$, $x_{HG}(t)$ and $x_{VG}(t)$ are shown for a sequence according to the invention for a traction downshift carried out as a splitter group downshift with the friction clutch K disengaged for a time ($x_K=0$). The gearshift begins at time t1* with the rapid disengagement (snatch operation) of the friction clutch K ($x_k=0$), after which the motor speed $n_{VM}$ increases due to the effect of the surplus torque of the internal combustion engine. Once the friction clutch K is disengaged, the load reduction of the internal combustion engine VM and the shifting of the splitter group VG from the current input gear K2 to the target input gear K1 begin at approximately the same time. After leaving the current shift position ($x_{VG}=K2$) in the splitter group VG, i.e. once the current input gear K2 has been disengaged, from time t2* the synchronization of the internal combustion engine VM and the transmission input shaft GE takes place by partial engagement of the friction clutch K ($x_K>0$) and by a brief motor operation ($M_{S/G}>0$) of the electric machine S/G. When the synchronous speed has been reached at time t3*, the target input gear K1 of the splitter group VG is first engaged. Then the friction clutch K is engaged completely ($x_K=1$) and at the same time the load of the internal combustion engine VM is increased, assisted and sped up by brief operation of the electric machine S/G as a motor $M_{S/G}>0$). At time t4* the friction clutch K is completely engaged ($x_K=1$) and the load increase of the according to the invention has been completed, whereby the shifting process as a whole is finished. In contrast to the process variants described earlier, in this shift control method the current gear in the main transmission HG remains engaged ($x_{HG}=1$) throughout the entire shifting sequence.

INDEXES

GE Transmission input shaft
HG Main transmission
i Gear ratio
$i_{S/G}$ Gear ratio of the electric machine
K Friction clutch
K1 Slow input stage of the upstream or splitter group
K2 Fast input stage of the upstream or splitter group
M Torque
$M_{S/G}$ Torque of the electric machine
$M_{VM}$ Torque of the internal combustion engine
n Rotational speed
$n_{GE}$ Rotational speed of the transmission input shaft
$n_{S/G}$ Rotational speed of the electric machine
$n_{VM}$ Engine speed, rotational speed of the internal combustion engine
S/G Electric machine
VG Upstream group, splitter group
VM Internal combustion engine
t Time
t1-t4 Time points
t1'-t4' Time points
t1*-t4* Time points
$x_{HG}$ Shifting position of the main transmission
$x_K$ Closure degree of the friction clutch
$x_{VG}$ Shifting position of the upstream or splitter group
$\Delta M_{VM}$ Residual torque of the internal combustion engine

The invention claimed is:

1. A method of controlling a drive-train of a motor vehicle, in which the drive train comprises an internal combustion engine (VM) with a driveshaft, an electric machine (S/G) that is drivingly connected with the driveshaft of the internal combustion engine, a semi-automatic transmission with an input shaft (GE) and a plurality of gears that are selectively engagable, and an automated friction clutch (K) arranged between the driveshaft of the internal combustion engine and the input shaft of the transmission, such that a gearshift of the transmission occurs in combination with suitable control of the internal combustion engine while the friction clutch is at least one of at least partially and briefly engaged, the method comprising the steps of:
   operating the electric machine (SIG) briefly as at least one of a generator and a motor to speed up a process of the gearshift and to attenuate torque and speed surges during the gearshift process.

2. The method according to claim 1, further comprising the step of assisting and accelerating a load reduction of the internal combustion engine (VM), at a beginning of the shifting process, for either a traction upshift or a traction downshift by briefly operating the electric machine as a generator ($M_{S/G}<0$).

3. The method according to claim 1, further comprising the step of assisting and accelerating a load reduction of the internal combustion engine (VM) at a beginning of the shifting process for either a thrust upshift or a thrust downshift by briefly operating the electric machine as a motor ($M_{S/G}>0$).

4. The method according to claim 1, further comprising the step of assisting and accelerating synchronization of the target gear during an upshift with the friction clutch at least partially engaged ($x_K>0$) by briefly operating the electric machine as a generator ($M_{S/G}<0$), or alone by a generator operation of the electric machine.

5. The method according to claim 1, further comprising the step of assisting and accelerating synchronization of the target gear during a downshift with the friction clutch at least partially engaged ($x_K>0$) by briefly operating the electric machine as a motor ($M_{S/G}>0$).

6. The method according to claim 1, further comprising the step of assisting and accelerating a load increase of the internal combustion engine (VM) at the end of the shifting process during either a traction upshift or a traction downshift by briefly operating the electric machine as a motor ($M_{S/G}>0$).

7. The method according to claim 1, further comprising the step of assisting and accelerating a load increase of the internal combustion engine (VM) at an end of the shifting process during either a thrust upshift or a thrust downshift by briefly operating the electric machine a generator ($M_{S/G}<0$).

8. The method according to claim 1, further comprising the step of carrying out a traction downshift in a group transmission with a multi-stage main transmission (HG) and a two-stage splitter group (VG) connected upstream therefrom, as a splitter group downshift with the friction clutch engaged ($x_K=1$), using the following steps:
   a) accelerating a load reduction of the internal combustion engine (VM) by operation of the electric machine ($M_{S/G}<0$) as a generator,
   b) disengaging of a current gear in the main transmission ($x_{HG}=0$),
   c) shifting of the splitter group (VG) from a current input gear (K2) to a target input gear (K1),
   d) synchronizing of the target input gear (K1) of the splitter group (VG) between leaving an actual shift position ($x_{VG}=K2$) and reaching a target shift position ($x_{VG}=K1$) in the splitter group (VG) by speeding up the internal combustion engine (VM), this being accelerated by operation of the electric machine as a motor,
   e) re-engaging the current gear in the main transmission, and
   f) increasing the internal combustion engine load, this being speeded up by operation of the electric machine ($M_{SG}>0$) as a motor.

9. The method according to claim 8, further comprising the step of reducing the load of the internal combustion engine (VM) until zero torque ($M_{VM}=0$) is reached.

10. The method according to claim 8, further comprising the step of reducing the load of the internal combustion engine (VM) until a positive residual torque ($M_{VM}=M_{VM}>0$) is reached, and rendering the transmission input shaft (GE) load-free by uptake of a corresponding torque $M_{S/G}=-M_{VM}<0$) by operating the electric machine (S/G) as a generator.

11. The method according to claim 1, further comprising the step of carrying out a traction downshift in a group transmission with a multi-stage main transmission (HG) and a two-stage splitter group (VG) connected upstream therefrom, as a main transmission downshift with the friction clutch engaged ($x_K=1$), using the following steps:
   a) accelerating load reduction of the internal combustion engine (VM) by operation of the electric machine ($M_{S/G}<0$) as a generator,
   c') shifting of the main transmission (HG) from a current input gear to a target input gear,
   d') synchronizing of the target gear of the main transmission (HG) between leaving a current shift position and reaching a target shift position of the main transmission (HG), by accelerating the internal combustion engine (VM), this being sped up by operation of the electric machine ($M_{S/G}$>0) as a motor, and f) increasing the internal combustion engine (VM) load, this being sped up by operation of the electric machine ($M_{S/G}$>0) as a motor.

12. The method according to claim 1, further comprising the step of a carrying out a traction downshift in a group transmission with a multi-stage main transmission (HG) and a two-stage splitter group (VG) connected upstream therefrom as a combined splitter group upshift and a main transmission downshift with the friction clutch engaged ($x_K$=1), using the following steps:
  a) accelerating load decrease of the internal combustion engine (VM) by operation of the electric machine ($M_{S/G}$<0) as a generator,
  b) disengaging of a current gear in the main transmission ($x_{HG}$=0),
  c) shifting of the splitter group (VG) from a current input gear (K1) to a target input gear (K2),
  d") synchronizing the target input gear (K2) in the splitter group (VG) between leaving a current shift position ($x_{VG}$=K1) and reaching a target shift position ($x_{VG}$=K2) in the splitter group (VG) by slowing down the internal combustion engine (VM), this being accelerated either by operation of the electric machine ($M_{SG}$<0) as a generator, or by operation of the electric machine alone ($M_{SG}$<0) as a generator,
  d') synchronizing of the target gear in the main transmission (HG) by accelerating the internal combustion engine (VM), this being sped up by motor operation of the electric machine ($M_{SG}$>0),
  e') engaging the target gear in the main transmission (HG), and
  f) increasing the internal combustion engine (VM) load, this being sped up by operation of the electric machine ($M_{SG}$>0) as a motor.

13. The method according to claim 1, further comprising the step of a carrying out a traction upshift carried in a group transmission with a multi-stage main transmission (HG) and a two-stage splitter group (VG) connected upstream therefrom, as a splitter group upshift with the friction clutch engaged ($x_K$=1), using the following steps:
  g) accelerating reduction of the internal combustion engine (VM) load by operation of the electric machine ($M_{S/G}$<0) as a generator,
  h) disengaging of a current gear in the main transmission ($x_{HG}$=0),
  i) shifting of the splitter group (VG) from a current input gear (K1) to a target input gear (K2),
  j) synchronizing the target input gear (K2) in the splitter group (VG) between leaving a current shift position ($x_{VG}$=K1) and reaching a target shift position ($x_{VG}$=K2) in the splitter group, by slowing down the internal combustion engine (VM), this being accelerated either by operation of the electric machine ($M_{S/G}$<0) as a generator or by operation of the electric machine alone ($M_{S/G}$<0) as a generator,
  k) re-engaging the current gear in the main transmission ($x_{HG}$=1), and
  l) increasing the internal combustion engine (VM) load, this being sped up by operation of the electric machine ($M_{S/G}$>1) as a motor.

14. The method according to claim 1, further comprising the step of a carrying out a traction upshift in a group transmission with a multi-stage main transmission (HG) and a two-stage splitter group (VG) connected upstream therefrom, as a main transmission upshift with the friction clutch closed ($x_K$=1), using the following steps:
  g) accelerating reduction of the internal combustion engine (VM) load by operation of the electric machine ($M_{S/G}$<0) as a generator,
  l') shifting of the main transmission (HG) from a current gear to a target gear,
  j') synchronizing the target gear in the main transmission (HG) between leaving a current shifting position and reaching a target shifting position in the main transmission (HG) by slowing down the internal combustion engine (VM), this being accelerated either by operation of the electric machine ($M_{S/G}$<0) as a generator or by operation of the electric machine alone ($M_{S/G}$<0) as a generator, and
  l) increasing the internal combustion engine (VM) load, this being accelerated by operation of the electric machine ($M_{S/G}$>0) as a motor.

15. The method according to claim 1, further comprising the step of a carrying out a traction upshift in a group transmission with a multi-stage main transmission (HG) and a two-stage splitter group (VG) connected upstream therefrom, as a combined splitter group downshift and a main transmission upshift with the friction clutch engaged ($x_K$=1), using the following steps:
  g) accelerating reduction of the internal combustion engine (VM) load by operation of the electric machine ($M_{S/G}$<0) as a generator,
  h) disengaging a current gear in the main transmission ($x_{HG}$=0),
  l) shifting the splitter group (VG) from a current input gear (K2) to a target input gear (K1),
  j") synchronizing the target input gear (K1) in the splitter group (VG) between leaving a current shifting position ($x_{VG}$=K2) and reaching a target shifting position ($x_{VG}$=K1) in the splitter group (VG) by accelerating the internal combustion engine (VM), this being sped up by operation of the electric machine ($M_{S/G}$>0) as a motor,
  j') synchronizing the target gear in the main transmission (HG) by slowing down the internal combustion engine (VM), this being accelerated either by operation of the electric machine ($M_{S/G}$>0) as a generator or by operation of the electric machine alone ($M_{S/G}$<0) as a generator,
  k') engaging the target gear in the main transmission (HG), and
  l) increasing the internal combustion engine (VM) load, this being accelerated by operation of the electric machine ($M_{S/G}$>0) as a motor.

16. The method according to claim 1, further comprising the step of carrying out a traction downshift in a group transmission with a multi-stage main transmission (HG) and a two-stage splitter group (VG) connected upstream therefrom, as a splitter group downshift with a briefly disengaged friction clutch ($x_K$=0), using the following steps:
  m) briefly disengaging (snatch operation) the friction clutch ($x_K$=0),
  n) reducing load and acceleration of the internal combustion engine (VM) to a target speed of a target input gear (K1) in the splitter group (VG),
  o) shifting of the splitter group (VG) from a current input gear (K2) to a target input gear (K1),
  p) synchronizing the target input gear (K1) in the splitter group (VG) between leaving a current shifting position ($x_{VG}$=K2) and reaching a target shifting position ($x_{VG}$=K1) in the splitter group (VG) by partially engaging the friction clutch $x_K$>0) and by operation of the electric machine ($M_{S/G}$>0) as a motor, and q) completely engaging the friction clutch ($x_K=1$) and increasing the internal combustion engine (VM) load, this being accelerated by operation of the electric machine ($M_{S/G}>0$) as a generator.

* * * * *